United States Patent [19]

Mefford

[11] Patent Number: 5,305,847
[45] Date of Patent: Apr. 26, 1994

[54] DUAL MODE ENGINE/TRANSMISSION MOUNT

[75] Inventor: Jack L. Mefford, Sterling Heights, Mich.

[73] Assignee: Chrysler Corporation, Highland Park, Mich.

[21] Appl. No.: 71,903

[22] Filed: Jun. 3, 1993

Related U.S. Application Data

[63] Continuation-in-part of Ser. No. 938,742, Sep. 2, 1992, abandoned.

[51] Int. Cl.[5] .......................... B60K 5/00; F16M 5/00
[52] U.S. Cl. .................................... 180/292; 180/291;
180/312; 180/297; 248/680; 248/500; 29/523
[58] Field of Search ............... 180/291, 344, 377, 381,
180/382, 292, 297, 312; 248/680, 500; 403/370;
29/520, 523; 267/140.4, 141.4, 141.2, 141.4

[56] References Cited

U.S. PATENT DOCUMENTS

| | | | |
|---|---|---|---|
| 1,256,550 | 2/1918 | Goold et al. | 180/291 X |
| 1,263,879 | 4/1918 | Gerosa | 180/291 |
| 1,493,063 | 5/1924 | Blaine | 403/370 |
| 1,766,925 | 6/1930 | Moorhouse | 180/291 X |
| 2,266,116 | 12/1941 | Best | 180/291 |
| 2,691,541 | 10/1954 | Benedek | 403/370 |
| 2,850,308 | 9/1958 | Febvre et al. | 403/104 |
| 3,705,701 | 12/1972 | Hunt | 180/291 X |
| 3,752,430 | 8/1973 | Kenyon et al. | 248/231.2 |
| 4,078,276 | 3/1978 | Nunes | 16/271 |
| 4,352,510 | 10/1982 | Saito et al. | 180/377 X |
| 4,405,027 | 9/1983 | Enokimoto et al. | 180/297 X |
| 4,464,076 | 8/1984 | Leibhard | 403/297 |
| 4,706,437 | 11/1987 | Boecker, Jr. | 52/698 |
| 4,893,779 | 1/1990 | Bergelt | 180/292 X |
| 5,154,403 | 10/1992 | Sato | 180/312 X |
| 5,193,642 | 3/1993 | Miyake | 180/312 |
| 5,219,037 | 6/1993 | Smith et al. | 180/312 |

FOREIGN PATENT DOCUMENTS 3-243418  10/1991  Japan ................................. 180/291

Primary Examiner—Margaret A. Focarino
Assistant Examiner—Florian Zeender
Attorney, Agent, or Firm—Kenneth H. MacLean

[57] ABSTRACT

An engine/transmission mount for a vehicle including first and second brackets, the first defining an aperture, the second having spaced legs to either side of the first bracket. An elongated bar which has ends adjacent the legs and extends through the aperture is radially expandable whenever the legs are flexed toward one another by selective application of compressive forces on the legs by operation of a compressive fastener. While prior to operation of the compressive fastener the first bracket is free to slide along the elongated bar, radial expansion of the elongated member fixes the first bracket in a desired axial position.

8 Claims, 4 Drawing Sheets

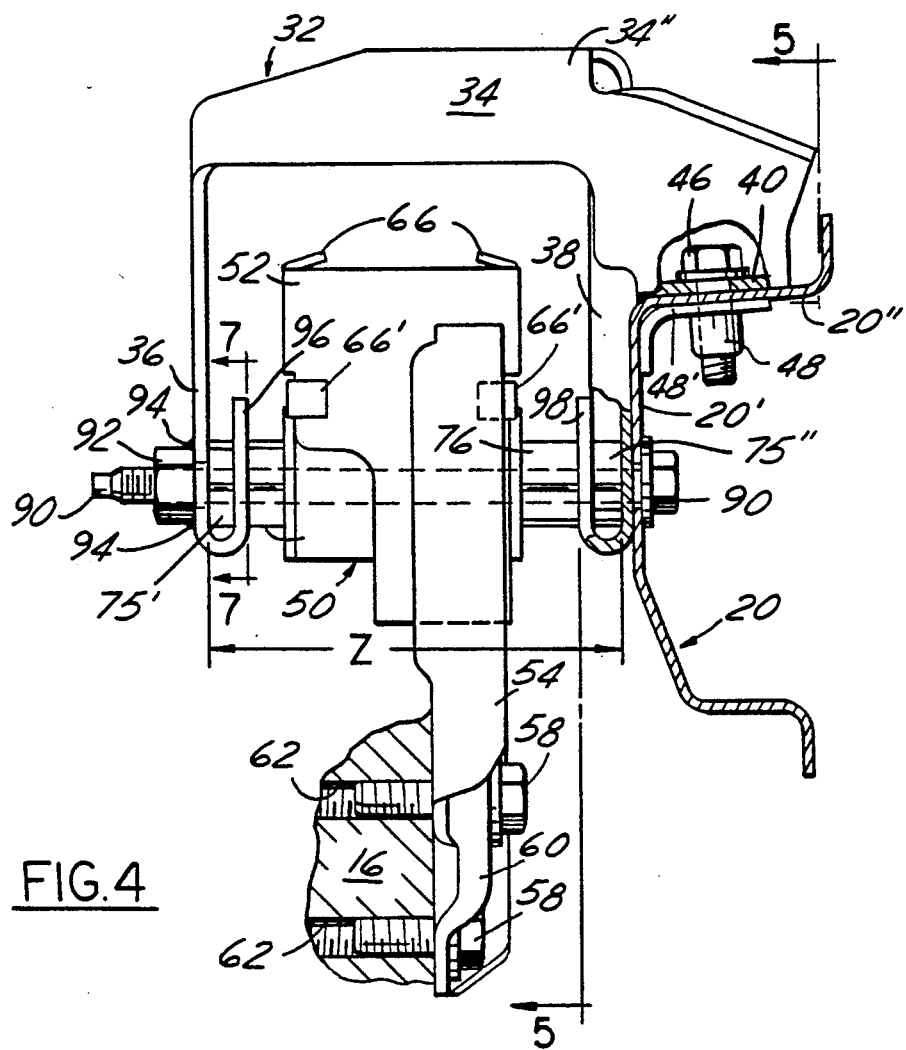
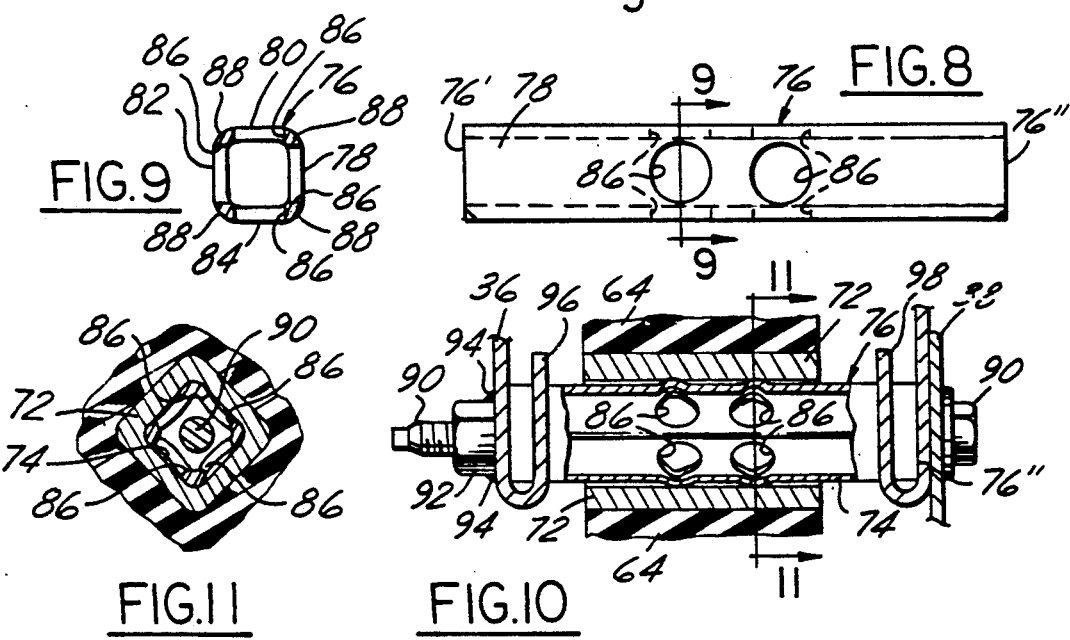

DUAL MODE ENGINE/TRANSMISSION MOUNT

RELATED APPLICATIONS

This is a continuation-in-part of application Ser. No. 07/938,742, filed Sep. 2, 1992, now abandoned.

BACKGROUND OF THE INVENTION

Field of the Invention

This application concerns a versatile engine and/or transmission mount for a vehicle having a first portion attached to the engine/transmission and having a second portion attached to the vehicle framing structure. One portion supports an elongated pin or bar member and another portion is slidably mounted on the pin or bar member during engine installation. After the engine/transmission is installed and in its desired location relative to the vehicle framing members, an axially directed contractual force is applied on the ends of the elongated bar member which generates a localized radial distortion thereby fixing the position of the one portion relative to the bar member and the other portion.

Description of Related Art

The subject engine mount is an improvement over the 1991 model year engine/transmission mount used for front wheel drive Chrysler vehicles with a four-cylinder engine. This current engine mount has a one portion attached to the engine/transmission and another portion attached to a vehicle framing member. An elongated member extends completely through one of the portions and has its ends operably connected and supported by the other portion. This permits the one portion to slide along the elongated member in the axial direction. Thus, when the engine/transmission s installed in the vehicle, the one portion of the mount automatically adjusts relative to the other portion to accommodate slight differences in spacing between the engine framing members which is a normal occurrence in vehicles. This slidable adjustment continues after engine installation unlike the improved mount which fixes the relative positions after installation and imparts stability.

The U.S. Pat. No. 2,850,308 to Febve generally discloses a radially expandable hinge pin with a split wedge structure. Devices having a similar structure are shown in U.S. Pat. Nos. 1,493,063; 2,691,541; and 4,078,276.

There are other examples of applications for tapered wedges and the like. The U.S. Pat. Nos. 612,489; 1,364,496; 2,280,662; 2,349,933; 2,505,648; 3,528,691; 3,752,430; 4,095,911; 4,274,301; 4,464,076; 4,706,437; and 4,916,970 all disclose applications of this wedge structure.

SUMMARY OF THE INVENTION

The subject improved engine and/or transmission mount includes an apertured portion which may be attached to the engine/transmission. It also includes a generally U-shaped portion which may be attached to the vehicle framing structure and having two spaced legs portions positioned on either side of the apertured portion. A tubular, elongated bar or pin extends through the apertured portions. Each opposite end of the bar engages one of the legs of the U-shaped portion. As in the current engine mount structure, the apertured member is allowed to slide along the bar during initial engine installation to accommodate variations in spacing of the vehicle's frame structure.

However, unlike the current mount, the above described sliding relation is terminated after the engine is in place or installed. This is accomplished by actuating a bolt and nut compressor which extends axially through the bar. The shortening of the bolt and nut compressor imposes a compressive, axial force on the bar. In one embodiment, adjacent apertures through the walls of the tubular bar produce thinned wedge portions between the apertures holes. The axially directed force on the bar causes the wedge portions to expand radially outward against the walls of the apertured portion to fix the relative positions between the bar and the apertured portion. In a second embodiment, the tubular bar is sawed from two opposite corners leaving integral connectors at the other pair of opposite corners. The axially directed force on the bar distorts the corner portions and radially shifts the parts of the bar to either side of the cut. The resultant radially outward shift presses the bar against the walls of the apertured portion to fix the relative positions.

Therefore, an object of this improved mounting device is to provide automatic adjustment during engine installation but to subsequently provide a fixed and locked locational relation after the engine is in its desired position relative to the vehicle framing members.

Another advantage of the subject improved mount is to utilize a tubular bar with material removed therefrom as a support for an apertured member so that the latter may slidably move along the bar during engine installation and subsequently the bar may be axially compressed by a bolt fastener to generate radial expansion to fix the apertured member relative to the bar.

Still further objects and advantages of the subject improved engine/transmission mount will be more apparent by reference to the following detailed description of an embodiment, reference being made to the drawings thereof as described hereafter.

IN THE DRAWINGS

FIG. 1 is a top planar view of the forward portion of a vehicle with the subject engine/transmission mount attached between a vehicle framing member and the engine/transmission; and FIG. 2 is an enlarged elevational front view of the engine/transmission mount shown in FIG. 1; and FIG. 3 is a greatly enlarged view of the mount in a top view like FIG. 1 and broken away to reveal details; and FIG. 4 is an enlarged front elevational view of the mount looking in the direction of arrowed line 4 in FIG. 3 and including broken out sectioned details of the mounting arrangement; and FIG. 5 is an enlarged, sectioned side view of the mount taken along section line 5—5 in FIG. 4; and FIG. 6 is an enlarged partial sectioned view taken along section line 6—6 in FIG. 5 and looking in the direction of the arrows; and FIG. 7 is a partial sectioned view taken along section line 7—7 in FIG. 4; and FIG. 8 is front, elevational view showing a first embodiment of the bar member with apertures therethrough; and FIG. 9 is an end sectional view of the first embodiment of the bar member taken along section line 9—9 in FIG. 8; and FIG. 10 is an elevational sectioned view of an installed first embodiment of the bar member taken along the section line 10—10 in FIG. 3 and looking in the direction of the arrows; and FIG. 11 is an end, sectioned view of an installed first embodiment of the bar member looking in the direction of section line 11—11 in FIG. 10; and FIG. 12 is a front, elevational view of a second embodiment of the tubular bar member revealing one of two cuts formed in adjacent faces therein; and FIG. 13 is a top, elevational view of the second embodiment of the tubular bar member showing portions of two adjacent cuts formed in adjacent faces therein; and FIGS. 14 and 15 are sectioned end views of the second embodiment of the tubular bar member taken along section lines 14—14 and 15—15, respectively, in FIG. 12 and looking in the direction of the arrows; and FIG. 16 is a sectioned view of the second embodiment of the tubular bar member taken along section line 16—16 in FIG. 12 and looking in the direction of the arrows; and FIG. 17 is an elevational sectioned view similar to FIG. 10 of the mounting assembly including the second embodiment of the tubular bar member in an initial adjustment mode; and FIG. 18 is an elevational sectioned view similar to FIG. 10 of the mounting assembly including the second embodiment of the tubular bar member in a final installed mode; and FIG. 19 is a greatly enlarged partial view of the circled portion in FIG. 18.

DETAILED DESCRIPTION OF A PREFERRED EMBODIMENT

Figure 1:
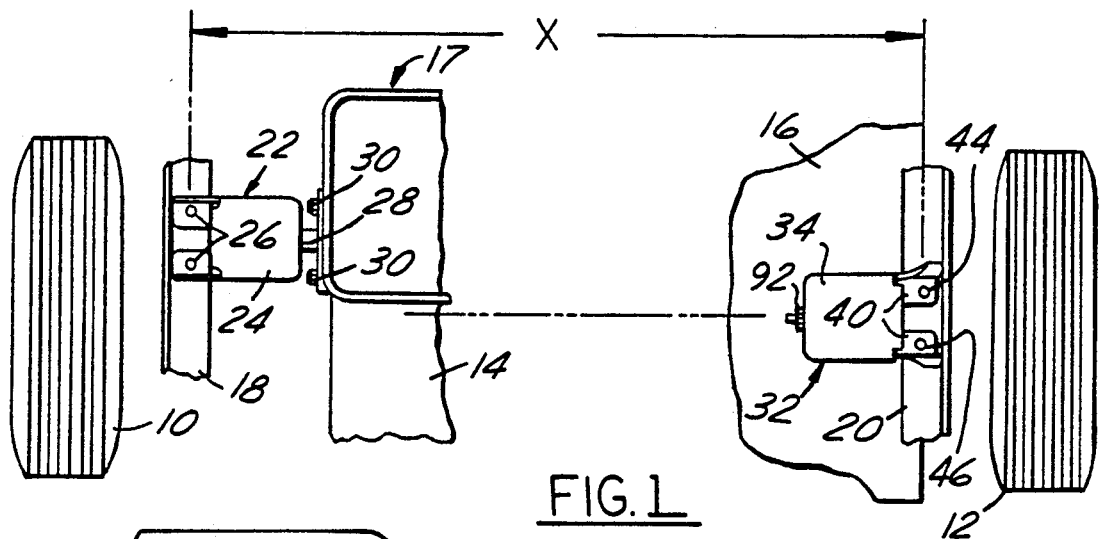
Figure 2:
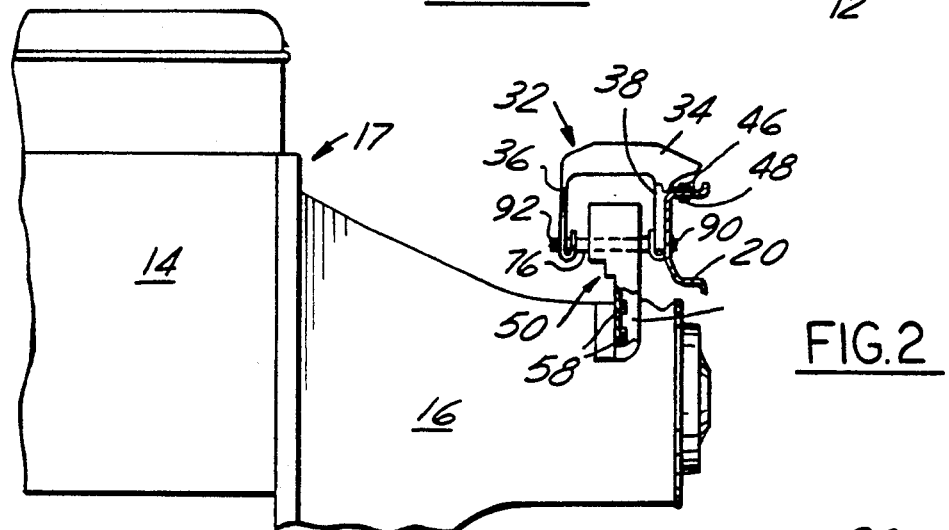

In FIG. 1, a top view of the forward end portion of a vehicle is shown including right and left front wheel assemblies 10 and 12, respectively. An engine 14 and a transmission 16 are partially shown between wheel assemblies 10, 12. The particular vehicle shown in FIG. 1 utilizes an integrated (connected) engine and transmission 17 which is transversely mounted in the vehicle and laterally as opposed to longitudinally (fore and aft). The engine/transmission 17 is supported between right frame member 18 and left frame member 20. The spacing X between the frame members 18, 20 is remarkably consistent from one vehicle to another. However, some slight variance can be expected. The subject dual mode mount is designed to accommodate this variance in spacing during installation of the engine.

The leftward portion of the engine/transmission 17 and the left frame member 18 in FIG. 1 are connected by a mount 22. Mount 22 has a bracket portion 24 attached to frame member 18 by fasteners 26. Another portion 28 is connected to the bracket 24 at one end and to the engine 14 at the other end by fasteners 30.

Figure 3:
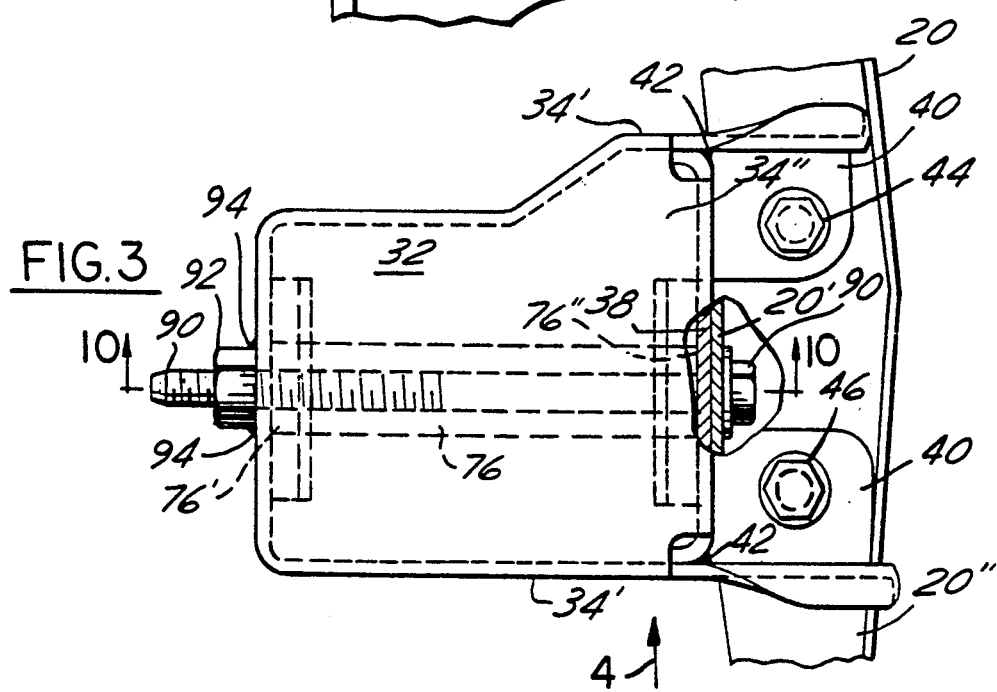

The rightward portion of the engine/transmission 17 is attached to the right frame member 20 in FIG. 1 by the subject engine/transmission mounting device 32. The mounting device 32 is best shown in enlarged FIGS. 2, 3, 4 and 5. The mount 32 has a substantially U-shaped portion or bracket 34 with the U-shape partially formed by a pair of spaced, depending leg portions 36 and 38. One leg portion 38 extends adjacent a side surface 20' of frame member 20. The bracket 34 has laterally projecting mounting portions or tabs 40 projecting outward from side surfaces 34' of main body of the bracket portion 34. As can be seen in FIG. 3, leg 38 depends from the upper surface 34'' and is attached to the sides 34' by weldments 42. The horizontal portions 40 of the mounting tabs overlie an upper surface 20'' of frame member 20. The bracket 32 is connected to frame 20 by fasteners 44 and 46 which extend through tab portions 40. As shown in FIG. 4, the fasteners thread into nut connectors 48. Back-up reinforcing plates 48' extend above nuts 48.

Figure 5:
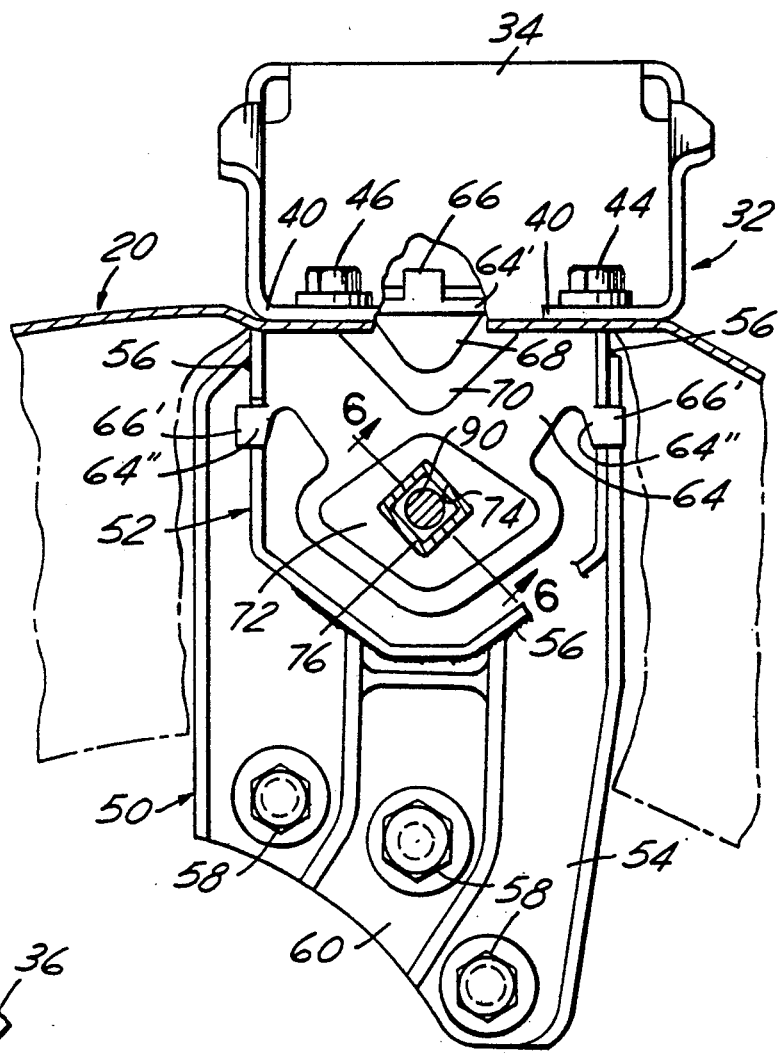
Figure 6:
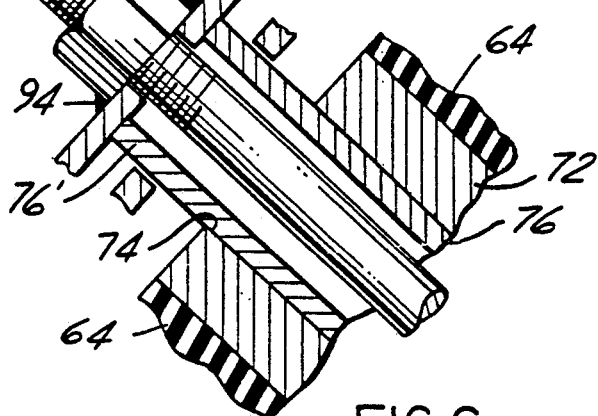

Referring to FIGS. 4 and 5, the mounting device 32 includes a second portion or bracket 50 which is a composite or assembly including an upper part 52 and a lower part 54. Weldments 56 integrally attach the portions 52, 54. For strength, the lower portion has a nonplanar configuration with a raised central ridge portion 60 and is connected to the transmission 16 of engine/transmission 17 by fasteners 58 which engage threaded apertures 62 in the transmission.

The upper portion 52 forms a generally tubular configuration best revealed in FIG. 5. The tubular portion houses an insert member 64 made of artificial rubber material. Bonded to the upper surface of the rubber insert 64 is a sheet metal base member 64' which has a pair of opposite tabs 66 which are folded over the upper edges of portion 52. Also, rubber coated or shinned metal side reinforcements 64'' are encapsulated in the sides of the rubber insert 64. Side reinforcements 64'' include side tabs 66' which are folded over the side edges of the tubular portion 52. The tabs 66, 66' position and secure the insert 64 in the tubular portion.

The rubber insert 64 is designed to separate brackets 32 and 50 and dampen vibrations therebetween by the natural properties of the rubber material. The response of the insert to vibrations can be modified so as to perform in a desired manner by configuring the insert as shown in FIG. 5. A thickened central portion 68 extends beneath the metal member 64' and a thin wall 70 of rubber connects portion 68 with the remainder of the insert. By modifying the thickness and size of the parts, the insert becomes more or less resilient.

The central portion of the insert 64 holds a rigid tubular member 72 which can be of hard plastic or metal. The member 72 is encapsulated in the rubber of the insert and has a non-circular outer shape to prevent rotation in the insert 64. Tubular member 72 defines an inner non-circular aperture 74 which has a square configuration in the preferred embodiment and with the axis of aperture 74 extending normal to the planes of the legs 36, 38 of bracket 32.

The First Modification or Embodiment

An elongated tubular beam or bar member 76 extends between the legs 36, 38 of bracket portion 32 and also extends through aperture 74 in member 72 to interconnect bracket portions 32 and 52 as best shown in FIGS. 3 and 4. Bar member 76 has a square outer configuration corresponding to aperture 74 in the insert tube 72 sized to permit sliding movement therebetween prior to installation of the engine into the vehicle. Opposite ends 76' and 76'' of beam 76 are engaged by leg portions 36, 38 respectively.

The four side walls 78, 80, 82 and 84 of the tubular bar or beam 76 have significant material removed by forming apertures or holes 86 which extend through the walls as shown in FIGS. 8-10. The resultant integral corner material 88 located between adjacent apertures 86 interconnects left and right portions of the bar. The integral corners 88 obviously form relatively weak areas. When the tubular bar member is subjected to significant compression in its axial direction, the relatively weak corners 88, acting as short columns, tend to buckle and migrate radially outward as shown in FIGS. 10-11. The surrounding metal member 72 retains the corner material but the prior sliding capacity between the members 72 and 76 is inhibited.

The above described localized radial expansion of the corners 88 is desirable subsequent to positioning the engine and transmission in the vehicle. However, once the engine is in place and the variation between spacing of beams 1 and 20 is accommodated by sliding of member 72 along member 76, it is desirable to axially fix the members 72, 76 together. In the subject embodiment, this is accomplished by applying a compressive axial force on the bar 76 causing radially outward distortion of the corners against the walls of aperture 74. The compressive force is generated by the bolt 90, the head of which engages the leg 38. The bolt shank extends through bar 76, through leg 36 and threadably extends into a nut 92 which is welded to leg 36 at 94. Turning of the bolt head draws the legs 36, 38 toward one another and places a compressive force on the bar.

Figure 7:
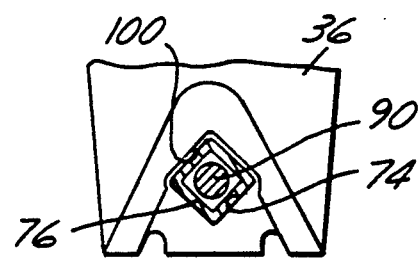

A final feature of the mount involves means to position and hold the bar 76 relative to the legs of bracket 34. Specifically, the lower portion of the legs 36 and 38 are turned inward, then upward as best shown in FIG. 4. The upwardly extending portions 96, 98 have an opening to define a socket 100 as seen in FIG. 7. The socket is open to receive the bar and configured to receive the square cross-sectional shape of the beam assembly 76. This prevents movement of the ends of bar 76 relative to the legs 36, 38 prior to tightening the bolt and nut 90, 92.

The Second Modification or Embodiment

Figures 12, 14, 15:
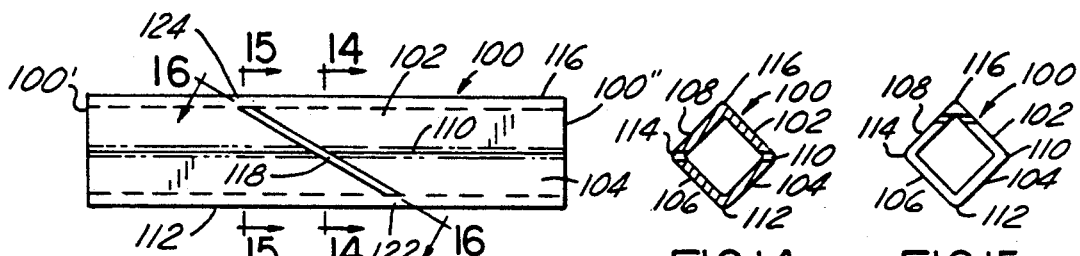
Figure 13:
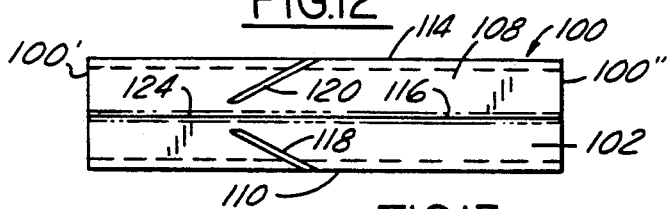
Figure 19:
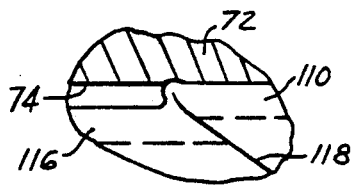
Figure 16:
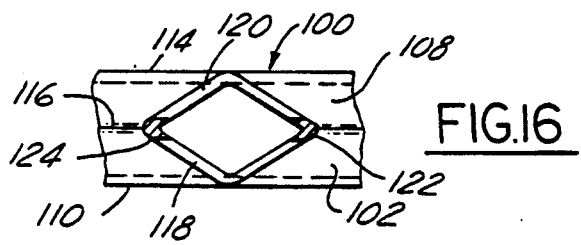

FIGS. 1-7 illustrate the basic engine/transmission mount and FIGS. 8-11 show a first embodiment of the tubular bar member 76. In FIGS. 12-19, a second embodiment or a modification of the tubular bar member is shown. As the basic parts of the mount shown in FIGS. 1-7 are the same, the numeric labeling of these parts is continued but the numeric labeling of the first and second embodiments of the tubular members are changed. The modification or second embodiment of the tubular bar 100 is best illustrated in FIGS. 12 and 13. Like tubular bar 76, the member 100 is an elongated structure which extends between the legs 36, 38 of the bracket portion 34. Bar member 100 extends through aperture 74 in member 72 to interconnect bracket portions 32 and 52 as best shown in FIGS. 3 and 4.

Figure 17:
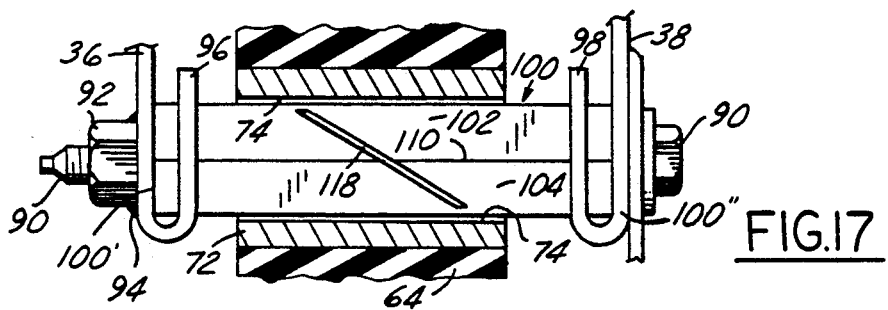

As understood by reference to FIG. 17, bar member 100 has a substantially square configuration corresponding to the aperture 74 in the insert tube 72 and is sized to permit sliding movement therebetween prior to installation of the engine into the vehicle. Opposite ends 1' and 100" of bar member 100 are engaged by leg portions 36, 38 respectively. The bar member has four side walls 102, 104, 106 and 108 of the tubular bar member 100 connected by edge portions 110, 112, 114, and 116. As best seen in FIGS. 12 and 13, a saw-like cut 118 extends in adjacent side surfaces 102 and 104 and in a plane extending obliquely to the axis of the member 100. Likewise, a second saw-like cut 120 extends in adjacent side surfaces 106 and 108 and in the same plane extending obliquely to the axis of the member 100. As seen in FIG. 12, the ends of each cut terminate close to opposite corners 112 and 116, thereby leaving integral corner material 122 and 124 which integrally connect the left and right end portions of the bar member 100.

Figure 18:
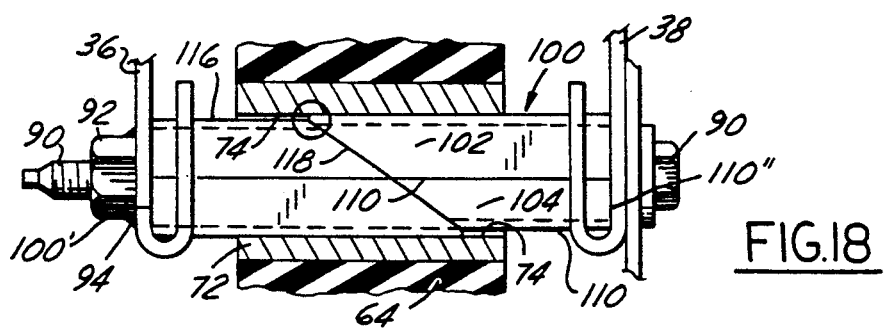

As illustrated in FIGS. 17 and 18, the tubular bar 100 is mounted between arms 36 and 38 of member 34. Thus, ends 100' and 100" of the bar are subjected to a significant compression when the arms 36, 38 are pulled toward one another by shortening of fastener 90 produced by threadable rotation of the fastener 90 into nut 92 which is attached to leg 36 by weldment 94. Upon compression, the relatively weak corners 122, 124 are distorted accompanied by an outward buckling best shown in FIG. 19. The outward distortion or buckling allows relative shifting of the left and right portions of the bar member 100 as best shown in FIG. 18 and in the enlarged partial view FIG. 19. This distortion terminates the ability of the member 72 to slide relative to bar 100 and therefore fixes the relative positions of mount portions 34 and 50.

Although two embodiments of the improved mount for an engine/transmission have been illustrated and described in detail, other modifications are contemplated and other structures are possible which still fall within the scope of the invention. Also, the improved mount is versatile enough to be used for either an engine or a transmission as well as the combined engine/transmission as shown. These modifications as well as others would still be defined by the following claims which define the invention.

What is claimed is as follows:

1. In a vehicle having a pair of spaced frame members for supporting an engine and transmission, a dual mode engine mount with a first mode for positioning an °/engine in which the mount automatically adjusts to dimensional variances in the spacing between the frame members and with a second mode for securing an engine in a fixed position in the vehicle where the mount maintains a desirable operative spaced relationship corresponding to the spacing between the frame members, comprising: the mount having a first bracket portion with an aperture therethrough and a second bracket portion with two spaced legs, each of said legs spaced to either side of the first bracket portion; an elongated tubular bar with opposite end portions, the bar being positioned between the two legs with the end portions abutting the legs, the bar having a midportion extending through the aperture of the first bracket portion; the midportion of said bar being weakened by removed material providing relatively weak integral corner portions whereby in the first mode the first bracket portion is free to slide along the bar to accommodate the variance in frame spacing; means for selectively applying a sufficient compressive force in an axial direction of the bar subsequent to the first mode causing outward radial distortion of the weak corner portions of said bar and resultant binding between the bar midportion and the first bracket portion thereby operatively fixing a positioning of the first bracket portion along the bar.

2. In a vehicle having a pair of spaced frame members for supporting an engine and transmission, a dual mode engine mount with a first mode for positioning an engine in which the mount automatically adjusts to dimensional variances in the spacing between the frame members and with a second mode for securing an engine in a fixed position in the vehicle where the mount upholds a desirable operative space relationship corresponding to the spacing between the frame members, comprising: the mount having a first bracket portion with an aperture therethrough and a second bracket portion with two spaced legs, each of said legs spaced to either side of the first bracket portion; an elongated tubular bar extending between the two legs and through the aperture of the first bracket portion; the bar having at least one aperture therethrough extending generally normal to its axis thereby defining relatively weak portions adjacent the aperture, whereby in the engine first mode the first bracket portion is allowed to slide along the bar; means for selectively applying a sufficient compressive axial force upon the bar subsequent to the first mode to cause the relatively weak portions adjacent the aperture to be distorted radially outwardly against the first bracket portion thereby operatively fixing the bar to the first bracket portion.

3. The mount set forth in claim 2 in which the tubular bar has at least two apertures therethrough with the axes of each aperture lying substantially in a common plane, thereby defining relatively weak portions between the apertures, whereby upon application of a sufficient compressive loading on the bar during the second mode the relatively weak portions buckle and portions are distorted radially outward against the first bracket portion thereby fixing a relative position between the bar and the first bracket portion.

4. The mount set forth in claim 2 in which the tubular bar is non-circular in cross-section and has at least three sides with at least one aperture through each side, with the axes of the apertures lying in a plane substantially normal the axis of the bar thereby defining relatively weak corner portions between the apertures which act as columns when a compressive force is applied to the bar, whereby the weak corner portions buckle under sufficient compressive force and distort radially outward against the first bracket portion thereby fixing the bar and first bracket portion together.

5. The mount set forth n claim 3 in which the compression force applying means extends between the two legs portions of the second bracket so that application of the compressive force moves one leg towards the other leg and exerts a sufficient compressive force upon the elongated bar to distort the weak portion radially outwardly.

6. In a vehicle having a pair of spaced frame members for supporting end portions of an engine and transmission, a mounting device having a first positioning mode for establishing a desired operative position automatically accommodating dimensional variances in the spacing between the vehicle frame members and a second securing mode fixing the mounting device in the desired operative position established in the first mode comprising: the mounting device having a first bracket portion having opposite side and an aperture therethrough; a second bracket portion with a generally U-shaped configuration and a pair of leg portions being spaced to either side of the first bracket portion sufficiently to allow movement of the first bracket portion therebetween; a tubular bar with an axis extending between the leg portions of the second bracket portion and through the aperture of the first bracket portion; the bar having a substantially square cross-sectional configuration with four side walls, each wall having an aperture therethrough with the aperture axes lying in a common plane substantially normal to the axis of the bar; thin corner columns between adjacent apertures, whereby the bar is configured so that the first bracket portion slides axially along the bar when in the first mode; elongated fastener means extending between the leg portions of the second bracket portion capable of selectively applying a compressive force in the second mode tending to flex the legs toward one another and exerting a compressive axial force on the bar to cause the corner columns to buckle and distort radially outward against the first bracket portion thereby fixing the first brackets portion at a desired axial position on the bar.

7. In a vehicle having a pair of spaced frame members for supporting end portions of an engine and transmission, a mounting device having a first positioning mode for establishing a desired operative position automatically accommodating dimensional variances in the spacing between the vehicle frame members and a second securing mode fixing the mounting device in the desired operative position established in the first mode, comprising: the mounting device having a first bracket portion having opposite sides and an aperture therethrough; a second bracket portion with a generally U-shaped configuration and a pair of leg portions being spaced to either side of the first bracket portion sufficiently to allow movement of the first bracket portion therebetween; a tubular bar with an axis extending between the leg portions of the second bracket portion and through the aperture of the first bracket portion; the bar having a substantially square cross-sectional configuration with four side walls integrally connected at corner portions; a first cutout portion extending through a first pair of adjacent side walls; a second cutout portion extending through a second pair of adjacent walls; the first cutout portion and the second cutout portion extending in a plane oblique to the axis of the bar and forming a pair of oppositely located, thin corner portions integrally connecting right and left end portions of the bar to either side of the cutout portions, whereby the bar is configured so that the first bracket portion slides axially along the bar when in the first mode; elongated fastener means extending between the legs of the second bracket portion capable of selectively applying a force tending to flex the leg portions of the second bracket toward one another and to exert an axially directed compressive force upon the end portions of the bar to cause distortion of the pair of oppositely located, thin corner portions in a radially outward direction allowing the right and left end portions of the bar to shift in radially outwardly opposite directions against the surrounding first bracket thereby fixing at a desired axial position the relative positions of the bar and the first bracket.

8. The mounting device set forth in claim 7 in which the elongated fastener means extends between the pair of leg portions of the second bracket so that application of the compressive force moves one leg towards the other leg and exerts a sufficient compressive force upon the tubular bar to distort the thin corner portions.

* * * * *